(12) United States Patent
Tatsumi et al.

(10) Patent No.: US 9,559,984 B2
(45) Date of Patent: Jan. 31, 2017

(54) COMMUNICATION SYSTEM AND NETWORK RELAY DEVICE

(71) Applicant: Hitachi Metals, Ltd., Tokyo (JP)

(72) Inventors: Tomoyoshi Tatsumi, Tsuchiura (JP); Wataru Kumagai, Ichikawa (JP)

(73) Assignee: HITACHI METALS, LTD., Tokyo (JP)

( * ) Notice: Subject to any disclaimer, the term of this patent is extended or adjusted under 35 U.S.C. 154(b) by 173 days.

(21) Appl. No.: 14/061,582

(22) Filed: Oct. 23, 2013

(65) Prior Publication Data
US 2014/0126352 A1   May 8, 2014

(30) Foreign Application Priority Data

Nov. 8, 2012 (JP) .................................. 2012-246650

(51) Int. Cl.
*H04L 12/28* (2006.01)
*H04L 12/933* (2013.01)
*H04L 12/947* (2013.01)

(52) U.S. Cl.
CPC .............. *H04L 49/10* (2013.01); *H04L 49/25* (2013.01)

(58) Field of Classification Search
CPC .................................................. H04L 41/0668
USPC ......................................... 370/220, 254–258
See application file for complete search history.

(56) References Cited

U.S. PATENT DOCUMENTS

| 2008/0068985 | A1* | 3/2008 | Mieno | 370/217 |
| 2011/0299551 | A1* | 12/2011 | Fiorone | H04L 45/00 370/401 |
| 2012/0033672 | A1* | 2/2012 | Page | H04L 45/245 370/395.53 |

FOREIGN PATENT DOCUMENTS

| JP | 2008-78893 A | 4/2008 |
| WO | WO 2012/018521 A1 | 2/2012 |

OTHER PUBLICATIONS

Japanese Office Action dated Oct. 6, 2015 with English Translation.

* cited by examiner

*Primary Examiner* — Ricky Ngo
*Assistant Examiner* — Wei-Po Kao
(74) *Attorney, Agent, or Firm* — McGinn IP Law Group, PLLC.

(57) ABSTRACT

A communication system includes a plurality of port switches that include first and second port switches, a plurality of fabric switches that construct communication paths among the plurality of port switches, and a user switch. Each of the plurality of port switches is connected to each of the plurality of fabric switches via different communication lines. The first and second port switches are connected by a common communication line between redundancy ports of the first and second port switches to thereby form a same domain group. The user switch is connected to each of the first and second port switches via different communication lines, and also sets link aggregation for ports of the user switch that are connection sources of the communication lines that connect the user switch and each of the first and second port switches.

7 Claims, 8 Drawing Sheets

COMMUNICATION SYSTEM AND NETWORK RELAY DEVICE

The present application is based on Japanese patent application No. 2012-246650 filed on Nov. 8, 2012, the entire contents of which are incorporated herein by reference.

BACKGROUND OF THE INVENTION

1. Field of the Invention

The present invention relates to a communication system and a network relay device, and, for example, relates to effective technology applied to a communication system in which link aggregation technology between a network relay device and a plurality of network relay devices is incorporated in part of a system constituted by a plurality of network relay devices.

2. Description of the Related Art

For example, Japanese Unexamined Patent Application Publication No. 2008-78893 discloses a configuration provided with a pair of box-type switch devices that are connected by means of redundancy ports, and edge switches (box-type switches) and an aggregation switch (chassis-type switch) that are connected to the pair of box-type switch devices. The edge switches are connected in a state where link aggregation is set for access ports having the same port numbers in the pair of box-type switch devices, and the aggregation switch is connected in a state where link aggregation is set for network ports having the same port numbers in the pair of box-type switch devices.

SUMMARY OF THE INVENTION

In recent years, technology for constructing a network system by combining a plurality of box-type switch devices instead of chassis-type switch devices has been receiving attention. Such a network system is provided with, for example, a plurality of box-type switch devices (herein referred to as port switches) for ensuring a required number of ports, and a plurality of box-type switch devices (herein referred to as fabric switches) for implementing connections among the port switches. The port switches are respectively connected to the fabric switches by communication lines, the fabric switches are connected in a star configuration with one port switch serving as a reference, and the port switches are also connected in a star configuration with one fabric switch serving as a reference. In the present specification, this kind of network system is referred to as a box-type fabric system.

In the box-type fabric system, one port switch for example is connected to the plurality of fabric switches via a plurality of communication lines, and can set link aggregation for a plurality of ports that are connection sources of the communication lines. If link aggregation is set, load distribution and redundancy within that link aggregation can be achieved. Therefore, if it is desirable for the communication band to be expanded for example, more fabric switches may be additionally provided, and the communication band can be expanded easily and with low costs. Furthermore, in this system, in addition to the aforementioned expansion of the communication band, the number of ports can also be increased easily and with low costs by additionally providing more port switches. As a result, if this system is used, a flexible system that meets user requirements can be constructed with low costs compared to using a system made up of chassis-type switch devices.

However, although it is possible for redundancy to be ensured in a box-type fabric system by means of the aforementioned link aggregation functionality when, for example, a fault has occurred in a communication line or a fabric switch, it is difficult to ensure redundancy when a fault has occurred in a box switch. However, as in Japanese Unexamined Patent Application Publication No. 2008-78893, for example, there is a system that achieves device redundancy by connecting two box-type switch devices, and setting link aggregation for access ports of the same port numbers for example of these two box-type switch devices. In the present specification, this system is referred to as multi-chassis link aggregation.

The present inventors focused on these advantages, and investigated achieving port switch redundancy (improving fault tolerance) and so on by combining multi-chassis link aggregation with the aforementioned box-type fabric system. As a result, it was found that the problem of signal loopback may occur.

The present invention takes such matters into account, and an objective thereof is to provide a communication system and a network relay device with which fault tolerance is improved and, furthermore, signal loopback can be prevented. The aforementioned objective, other objectives, and the novel features of the present invention will become apparent from the descriptions in the present specification and the appended drawings.

A summary of the representative embodiments from among the inventions disclosed in the present application is described in simple terms as follows.

A communication system according to the present embodiments is provided with: a plurality of port switches that include first and second port switches; a plurality of fabric switches that construct communication paths among the plurality of port switches; and a user switch. Each of the plurality of port switches is connected to each of the plurality of fabric switches via different communication lines. The first and second port switches are connected by a common communication line between redundancy ports to thereby form the same domain group. The user switch is connected to each of the first and second port switches via different communication lines, and sets link aggregation for ports that are connection sources of the communication lines. Each of the plurality of fabric switches sets, for a plurality of ports to which the first and second port switches that are constituent elements of the same domain group are connected, a sublink that causes the plurality of ports to logically function as one port.

Describing in simple terms the advantages obtained by the representative embodiments from among the inventions disclosed in the present application, it becomes possible to improve fault tolerance and to prevent signal loopback.

DESCRIPTION OF THE PREFERRED EMBODIMENTS

When necessary for reasons of convenience in the following embodiments, the description is divided into a plurality of sections or embodiments; however, with the exception of when specifically indicated, the following sections or embodiments are not unrelated to each other, and a relationship exists such that one section or embodiment serves as a modified example, a detailed description, or a supplementary description or the like of a portion or the entirety of the other section or embodiment. Furthermore, if the number and so on (including numbers of elements, numerical values, quantities, ranges, and so on) of an element is mentioned in the following embodiments, the embodiments are not restricted to the specified number, and a number greater than or less than the specified number is also permissible, with the exception of instances such as when specifically indicated and when the embodiment is in principle clearly restricted to the specified number.

In addition, it goes without saying that the constituent elements (including element steps and so on) are not necessarily essential in the following embodiments, with the exception of instances such as when specifically indicated and when the constituent elements are considered to be in principle clearly essential. Likewise, when the shape or positional relationship and so on of the constituent elements or the like is mentioned in the following embodiments, shapes or positional relationships and so on that are substantially close or similar thereto are included, with the exception of instances such as when specifically indicated and when in principle this is considered to be clearly not the case. The same is also true for the aforementioned numerical values and ranges.

Embodiments of the present invention will be described in detail hereafter on the basis of the drawings. It should be noted that, in all drawings for describing the embodiments, like reference symbols are in principle appended to like members, and repeated descriptions thereof are omitted.

Embodiment 1

First, prior to a description of a communication system according to the present embodiment 1, matters that were investigated as antecedents thereto will be described using FIG. 8 and FIG. 9.

<<Summary of a Box-Type Fabric System>>

Figure 8:
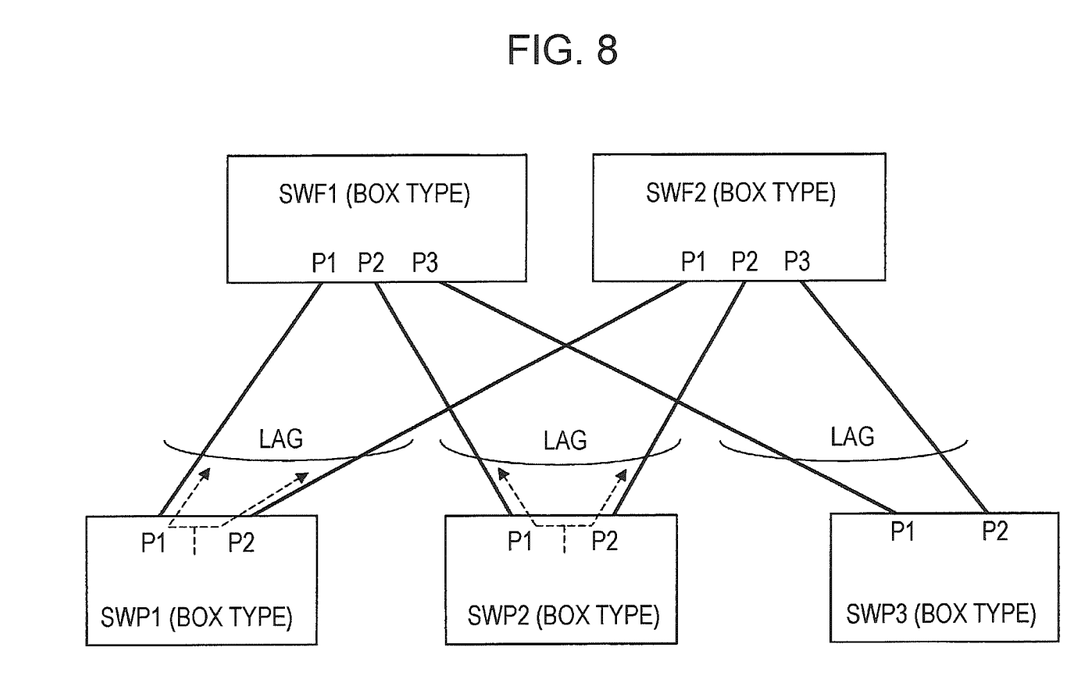
FIG. 8 is a schematic diagram illustrating an exemplary configuration of a box-type fabric system investigated as an antecedent to the present invention.

FIG. 8 is a schematic diagram illustrating an exemplary configuration of a box-type fabric system investigated as an antecedent to the present invention. As depicted in FIG. 8, a box-type fabric system is provided with a plurality of port switches SWP1 to SWP3 (three port switches in this case) that are box-type switch devices, and a plurality of fabric switches SWF1 and SWF2 (two fabric switches in this case) that are box-type switch devices. SWF1 and SWF2 construct communication paths among SWP1 to SWP3.

Each of the port switches SWP1 to SWP3 is connected to each of the fabric switches SWF1 and SWF2 via different communication lines. Specifically, port P1 and port P2 of SWP1 are connected to each of port P1 of SWF1 and port P1 of SWF2 via different communication lines. Furthermore, port P1 and port P2 of SWP2 are connected to each of port P2 of SWF1 and port P2 of SWF2 via different communication lines, and likewise port P1 and port P2 of SWP3 are connected to each of port P3 of SWF1 and port P3 of SWF2 via different communication lines. There are no particular restrictions with respect to the port switches and the fabric switches; however, the port switches and the fabric switches are implemented by means of box-type switch devices having the same configuration for example, and it is possible to select whether the box-type switch devices are to function as port switches or are to function as fabric switches, by means of the internal settings thereof.

Furthermore, in the box-type fabric system, one port switch for example (SWP1 for example) is connected to the plurality of fabric switches SWF1 and SWF2 via a plurality (two in this case) of communication lines (first communication lines), and can set link aggregation for the ports P1 and P2 that are connection sources of the communication lines. In the present specification, a group of ports (P1 and P2 in this case) for which this link aggregation has been set is referred to as a link aggregation group LAG. When link aggregation (a link aggregation group LAG) is set, load distribution can be achieved within that LAG.

For example, when a frame is transmitted from the port switch SWP1 to the port switch SWP3, that frame is appropriately distributed along a transmission path from the port P1 of SWP1 to SWP3 via SWF1, and along a transmission path from the port P2 of SWP1 to SWP3 via SWF2, on the basis of a predetermined rule. There are no particular restrictions with respect to the predetermined rule; however, an example is a system that performs calculations using header information (more specifically, the media access control (MAC) address of the transmission source and/or the destination, and in addition the IP address and so on of the transmission source and/or the destination) within a frame. It should be noted that, because ports for which a link aggregation group LAG has been set logically (virtually) function as one port, signal loopback does not occur such as when a broadcast frame that is input to the port P1 of the port switch SWP1 is output from the port P2 of SWP1.

<<Combination of Box-Type Fabric System and Multi-Chassis Link Aggregation>>

Figure 9:
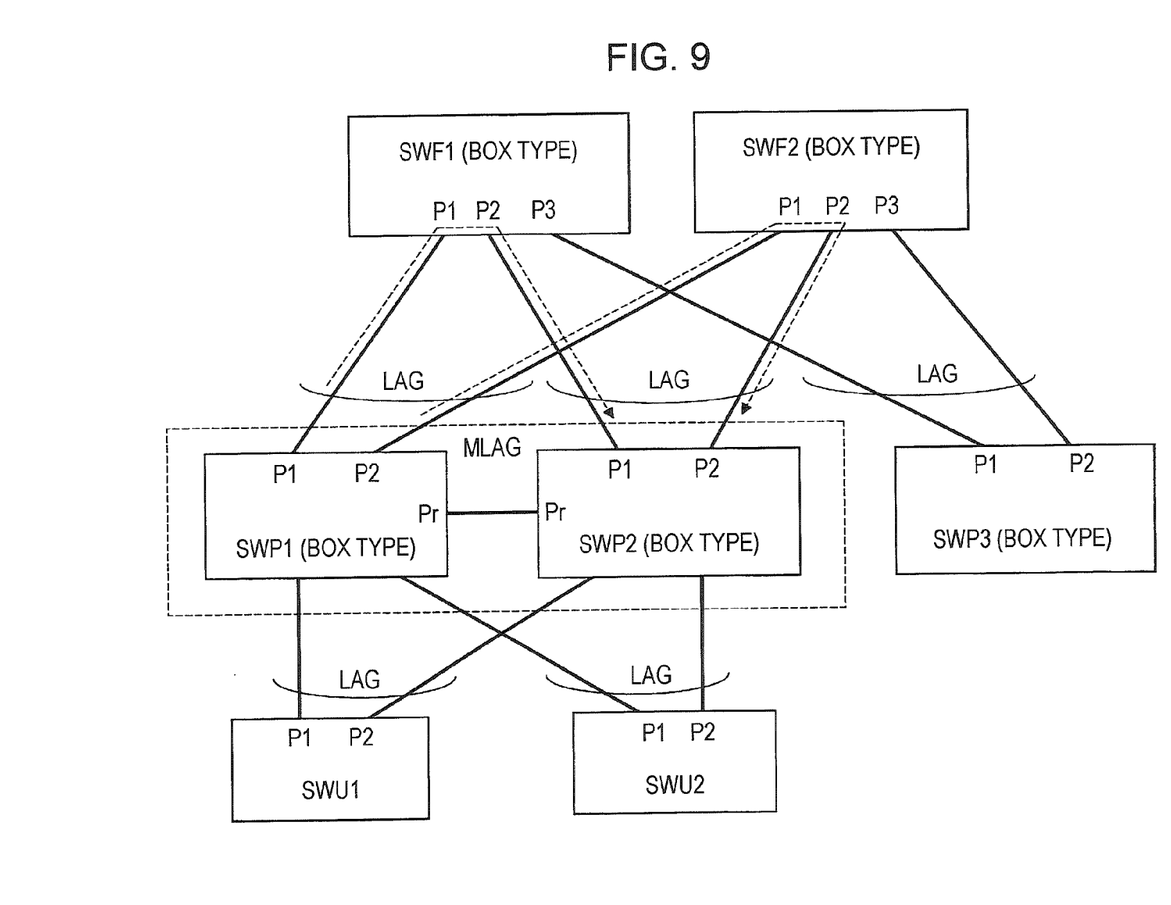
FIG. 9 is a schematic diagram depicting an exemplary configuration of when multi-chassis link aggregation is applied to the box-type fabric system of FIG. 8, and is also a diagram illustrating an example of the problems thereof.

FIG. 9 is a schematic diagram depicting an exemplary configuration of when multi-chassis link aggregation is applied to the box-type fabric system of FIG. 8, and is also a diagram illustrating an example of the problems thereof. In FIG. 9, in addition to the exemplary configuration of FIG. 8, the port switch SWP1 and the port switch SWP2 are each provided with a redundancy port Pr, and multi-chassis link aggregation is set for SWP1 and SWP2 by the redundancy ports Pr being connected by a common communication line therebetween. In the present specification, the group of SWP1 and SWP2 for which this multi-chassis link aggregation has been set is referred to as a multi-chassis link aggregation group MLAG.

In addition, in FIG. 9, user switches SWU1 and SWU2 are connected to the port switches SWP1 and SWP2 for which a multi-chassis link aggregation group MLAG is set. In the user switch SWU1, ports P1 and P2 are connected to each of SWP1 and SWP2 via different communication lines, and a link aggregation group LAG is set for P1 and P2 that are connection sources of these communication lines. Likewise, in the user switch SWU2 also, ports P1 and P2 are connected to each of SWP1 and SWP2 via different communication lines, and a LAG is set for P1 and P2 that are connection sources of these communication lines.

Due to the link aggregation group LAG, a frame transmitted from the user switch SWU1 is appropriately distributed and transmitted to the port P1 side or the port P2 side of SWU1 on the basis of the predetermined rule. Likewise, due to the LAG, a frame transmitted from the user switch SWU2 is also appropriately distributed and transmitted to the port P1 side or the port P2 side of SWU2 on the basis of the predetermined rule. The port switches SWP1 and SWP2, for which a multi-chassis link aggregation group MLAG is set, receive and transmit, for example, the mutual states thereof and information and so on of an address table (forwarding database: FDB) between the redundancy ports Pr, and logically (virtually) function as one switch. When this kind of multi-chassis link aggregation is used, an improvement in fault tolerance is attained in addition to an improvement in the communication band due to the load distribution. For example, even if a fault has occurred in SWP1, it is possible for transmission traffic from SWU1 and SWU2 to be aggregated and forwarded to the SWP2 side.

In a box-type fabric system such as that depicted in FIG. 8, it is possible to carry out, between the port switch SWP1 and the port switch SWP2, communication via the fabric switch SWF1, or communication via the fabric switch SWF2. However, if a multi-chassis link aggregation group MLAG is set as depicted in FIG. 9, SWP1 and SWP2 that have been set as a MLAG logically function as one switch and, consequently, the problem of signal loopback may occur.

To be specific, the case envisaged is, for example, when a broadcast frame or the like is transmitted from the port P1 of the port switch SWP1 to the port P1 of the fabric switch SWF1, and, in response to this, SWF1 forwards the broadcast frame from the port P2 and the port P3. In this case, focusing on the relationship between the multi-chassis link aggregation group MLAG and SWF1, as indicated by the dashed line in FIG. 9, the frame logically transmitted from one switch (SWP1 and SWP2) loops back to the same one switch (SWP1 and SWP2) via SWF1. Furthermore, for example, the same is also true for the case in which a broadcast frame or the like is transmitted from the port P2 of SWP1 to the port P1 of the fabric switch SWF2, and as depicted by the dashed line in FIG. 9, signal loopback occurs in the relationship between the MLAG and SWF2.

<<Configuration and Operation of a Communication System According to the Present Embodiment>>

Figure 1:
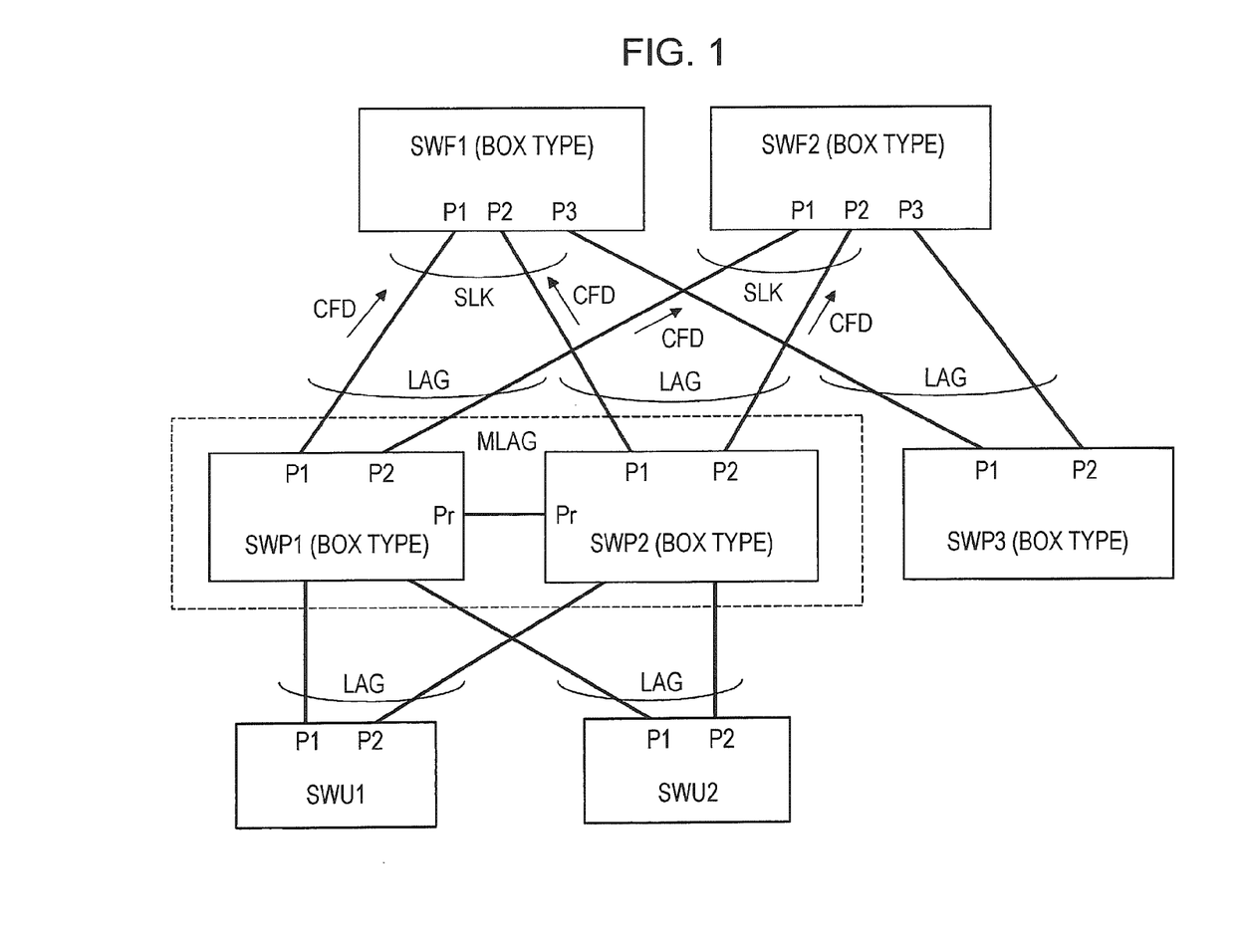
FIG. 1 is a schematic diagram illustrating an exemplary configuration and a main exemplary operation in a communication system according to embodiment 1 of the present invention.

FIG. 1 is a schematic diagram illustrating an exemplary configuration and a main exemplary operation in a communication system according to embodiment 1 of the present invention. The communication system depicted in FIG. 1 is provided with the same aforementioned configuration as that in FIG. 9, and is provided with a plurality (two in this case) of fabric switches (network relay devices) SWF1 and SWF2, a plurality (three in this case) of port switches (network relay devices) SWP1 to SWP3, and user switches SWU1 and SWU2. As previously mentioned, SWF1, SWF2, and SWP1 to SWP3 are each implemented by means of box-type switch devices, and, as a whole, form a box-type fabric system. Furthermore, SWP1 and SWP2 are connected by a common communication line between redundancy ports Pr to thereby form a multi-chassis link aggregation group (in other words, a domain group) MLAG, and, therefore, logically (virtually) function as one switch.

The port switch SWP1 is connected to each of the fabric switches SWF1 and SWF2 via different communication lines, and sets a link aggregation group LAG for ports P1 and P2 that are connection sources of these communication lines. Likewise, SWP2 sets, as a LAG, ports P1 and P2 that are connection sources of different communication lines to each of SWF1 and SWF2, and SWP3 also sets, as a LAG, ports P1 and P2 that are connection sources of different communication lines to each of SWF1 and SWF2. Furthermore, the user switch SWU1 sets, as a LAG, ports P1 and P2 that are connection sources of different communication lines to each of SWP1 and SWP2. Likewise, the user switch SWU2 also sets ports P1 and P2 that are connection sources of different communication lines to each of SWP1 and SWP2 as a LAG.

Fabric switches SWF1 and SWF2 construct communication paths among the port switches SWP1 to SWP3. For example, SWF1 detects the destination MAC address of a frame received from the SWP1 side, and if the MAC address and the port P3 are associated in an address table (FDB) of SWF1, the frame is forwarded from P3 to SWP3. During this process, in actuality, SWP1 receives, via SWU1, a frame from an undepicted terminal (a server for example) or the like connected to the user switch SWU1 for example, and forwards the frame to SWF1, and SWP3 forwards a frame received from the SWF1 side, to an undepicted terminal (a server for example) or the like connected to SWP3.

In this kind of configuration, each of SWP1 and SWP2, for which a multi-chassis link aggregation group (domain group) MLAG is set, transfer, to SWF1 and SWF2 respectively, control frames (control signals) CFD including the same domain identifiers indicating that SWP1 and SWP2 are constituent elements of the same MLAG. In addition, SWF1 sets a sublink SLK for a plurality of ports (P1 and P2 in this case) that have received the control frames CFD including these same domain identifiers, and likewise SWF2 also sets a sublink SLK for a plurality of ports (P1 and P2 in this case) that have received the control frames CFD including these same domain identifiers. Each of SWF1 and SWF2 cause the plurality of ports for which a SLK has been set, to logically (virtually) function as one port.

Therefore, for example, when a broadcast frame or the like is transmitted from the port P1 of the port switch SWP1 to the port P1 of the fabric switch SWF1, SWF1 accordingly forwards the broadcast frame from the port P3, and does not forward the broadcast frame from the port P2. For example, broadcast frames (or multicast frames) or the like are simultaneously transmitted from a port other than the ports at which the broadcast frames are received. Therefore, by causing P1 and P2 of SWF1 to function as one port, signal loopback no longer occurs between this P1 and P2 (in other words, in the relationship between the MLAG and SWF1). Furthermore, likewise for the case in which a broadcast frame or the like is transmitted from the port P2 of the port switch SWP1 to the port P1 of the fabric switch SWF2, by causing P1 and P2 of SWF2 to function as one port, signal loopback no longer occurs between this P1 and P2 (in other words, in the relationship between the MLAG and SWF2).

As described above, by using the communication system of FIG. 1, an improvement in fault tolerance is attained due to the application of multi-chassis link aggregation (device redundancy), and also signal loopback that may occur as a result of this application can be prevented, and it becomes possible to suppress a decline and so on in the communication bands between the port switches and the fabric switches. It should be noted that, although FIG. 1 depicts an exemplary configuration in which three port switches SWP1 to SWP3 and two fabric switches SWF1 and SWF2 are provided, there is of course no restriction to this configuration, and the number of ports switches and fabric switches can be appropriately altered. Furthermore, the number of multi-chassis link aggregation groups MLAG (domain groups) can also be, for example, appropriately altered as depicted in FIG. 2.

Figure 2:
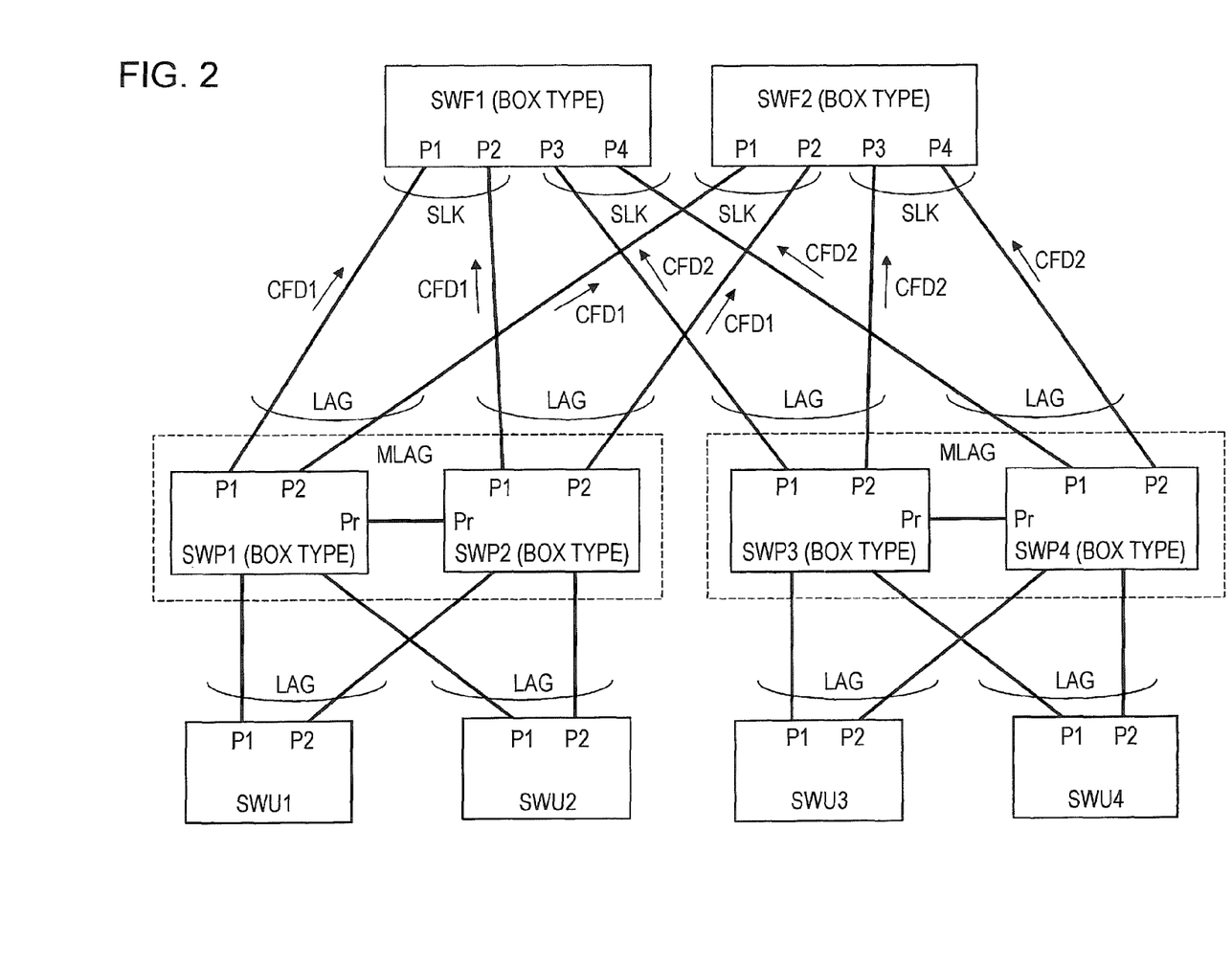
FIG. 2 is a schematic diagram illustrating an exemplary configuration and an exemplary operation in which the communication system of FIG. 1 is expanded.

FIG. 2 is a schematic diagram illustrating an exemplary configuration and an exemplary operation in which the communication system of FIG. 1 is expanded. The communication system depicted in FIG. 2 has a configuration in which a port switch SWP4 and user switches SWU3 and SWU4 are additionally added to the exemplary configuration of FIG. 1. The same multi-chassis link aggregation group (domain group [2]) MLAG is set for the port switch SWP4 together with the port switch SWP3. SWU3 and SWU4 are connected with SWP3 and SWP4 in the same way as the connection relationship between SWU1 and SWU2, and SWP1 and SWP2. Together with the addition of SWP4, a port P4 is added to each of the fabric switches SWF1 and SWF2 in addition to the exemplary configuration of FIG. 1. The port P1 of SWP4 is connected to P4 of SWF1 via a communication line, and the port P2 of SWP4 is connected to P4 of SWF2 via a communication line.

In this kind of configuration, as in the case of FIG. 1, each of SWP1 and SWP2 transmit, to each of SWF1 and SWF2, control frames (control signals) CFD1 that include the same domain identifiers (domain identifier [1]) indicating that the same MLAG (domain group [1]) is set. In addition, in FIG. 2, each of SWP3 and SWP4 also transmit, to each of SWF1 and SWF2, control frames (control signals) CFD2 including other same domain identifiers (domain identifier [2]) indicating that another same MLAG (domain group [2]) is set.

As in the case of FIG. 1, each of SWF1 and SWF2 receive the control frames (control signals) CFD1 including the same domain identifiers (domain identifier [1]), and set a sublink (sublink [1]) SLK for the ports P1 and P2 that received CFD1. In addition, in FIG. 2, each of SWF1 and SWF2 receive the control frames (control signals) CFD2 including the other same domain identifiers (domain identifier [2]), and set another sublink (sublink [2]) SLK for the ports P3 and P4 that received CFD2.

Therefore, in each of the fabric switches SWF1 and SWF2, the ports P1 and P2 logically function as one port, and the ports P3 and P4 also logically function as one port. As a result, in addition to signal loopback no longer occurring in the relationship between each of SWF1 and SWF2 and the MLAG (SWP1 and SWP2), signal loopback also no longer occurs in the relationship between each of SWF1 and SWF2 and the MLAG (SWP3 and SWP4).

<<Summary of a Fabric Switch (Network Relay Device)>>

Figure 3:
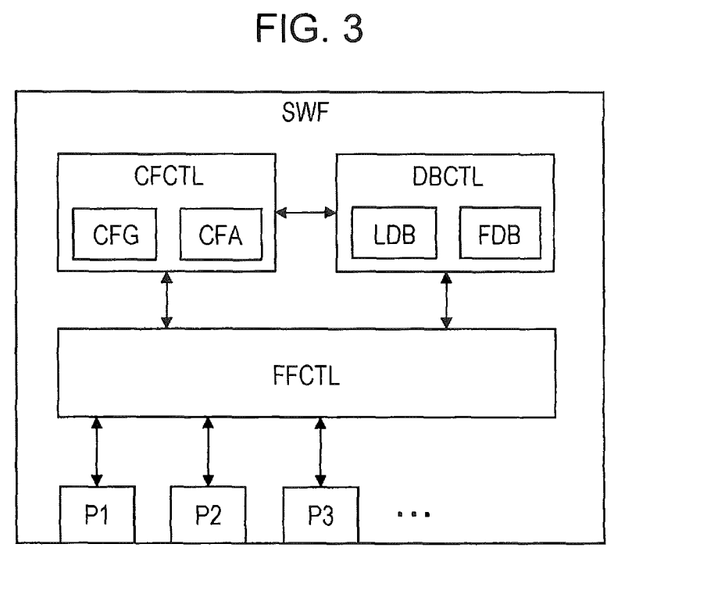
FIG. 3 is a block diagram illustrating an exemplary schematic configuration of the main section of a fabric switch in the communication system of FIG. 1.

FIG. 3 is a block diagram illustrating an exemplary schematic configuration of the main section of a fabric switch in the communication system of FIG. 1. The fabric switch (network relay device) SWF depicted in FIG. 3 is provided with a frame forwarding control unit FFCTL, a control frame management unit CFCTL, a database management unit DBCTL, and a plurality of ports (P1, P2, P3, . . . ) and so on. The ports P1, P2, P3, . . . are port-switch oriented ports, and, if SWF1 of FIG. 1 is used as an example, the port switches SWP1, SWP2, and SWP3 are connected to P1, P2, and P3, respectively. It should be noted that, although in this case the three port-switch oriented ports P1, P2, and P3 are representatively depicted, in the case four or more port switches are provided, four or more ports are accordingly provided.

The control frame management unit CFCTL is provided with a control frame generation unit (control signal generation unit) CFG and a control frame analysis unit (control signal analysis unit) CFA, and appropriately manages these. The CFG generates various types of control frames, and the frame forwarding control unit FFCTL (control signal transmission unit) transmits the generated control frames from the ports (P1, P2, P3, . . . ). The CFA analyses (determines) the contents of the control frames received by the FFCTL (control signal reception unit) via the ports (P1, P2, P3, . . . ). It should be noted that the control frames (control signals) are different from user frames, which include actual data signals from a terminal (a server for example) and so on, and are management-purpose frames for carrying out setting and monitoring and so on for the communication system.

The database management unit DBCTL is provided with an address table FDB and a link table LDB, and manages these. The corresponding relationships between the ports and the MAC addresses of terminals (servers) and so on connected to the ports are registered in the address table FDB. The setting states of link aggregation groups LAG and sublinks SLK are registered in the link table LDB. For example, if the fabric switch SWF1 of FIG. 1 is used as an example, information and so on indicating that a sublink SLK is set for ports P1 and P2 is registered. Furthermore, if SWF1 of FIG. 2 is used as an example, information and so on indicating that a sublink SLK is set for ports P1 and P2, and that another sublink SLK is set for ports P3 and P4 is registered.

The frame forwarding control unit FFCTL is provided with functionality for controlling the transmission and reception of control frames between the ports (P1, P2, P3, . . . ) and the control frame management unit CFCTL. The FFCTL is additionally provided with functionality for controlling the forwarding of frames (user frames for example) among the ports (P1, P2, P3, . . . ), on the basis of the information in the tables (FDB and LDB) of the database management unit DBCTL.

Figure 4:
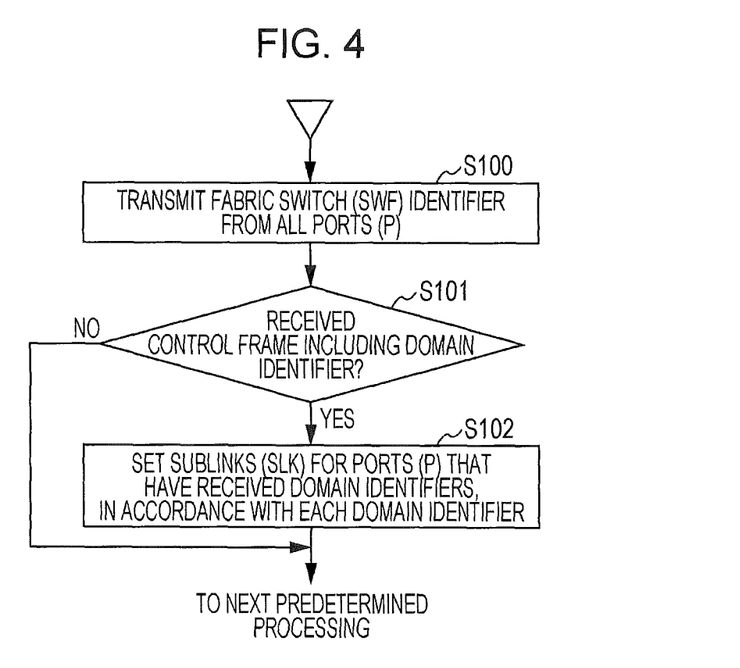
FIG. 4 is a flow diagram illustrating a main exemplary operation in the fabric switch of FIG. 3.

FIG. 4 is a flow diagram illustrating a main exemplary operation in the fabric switch of FIG. 3. In FIG. 4, first, the control frame generation unit (control signal generation unit) CFG of FIG. 3 generates control frames including a fabric switch identifier set in advance for the fabric switch of the control frame generation unit CFG, and transmits the control frames from all ports (P1, P2, P3, . . . ) via the frame forwarding control unit FFCTL (step S100). Due to the processing carried out in this step S100, for example, a port switch that has received the fabric switch identifier is able to recognize that the fabric switch is connected to the port which received the fabric switch identifier.

Next, when the frame forwarding control unit FFCTL of FIG. 3 has received frames from the ports (P1, P2, P3, . . . ), the frame forwarding control unit FFCTL determines whether or not the frames are control frames (control signals), and notifies the control frame analysis unit (control signal analysis unit) CFA if the frames are control frames. The CFA receives the notification and determines whether or not domain identifiers are present in the control frames (step S101). If domain identifiers are present, the CFA notifies the domain identifiers and the ports that received the domain identifiers, to the database management unit DBCTL. The DBCTL (link setting unit) registers, in the link table LDB, the relationship of the domain identifiers and the ports that have received the domain identifiers, and sets sublinks SLK for the ports in accordance with each domain identifier (S102). In other words, in the aforementioned example of SWF1 of FIG. 2, a SLK is set for ports P1 and P2 that received the same domain identifiers (domain identifier [1]), and another SLK is set for ports P3 and P4 that received another same domain identifier (domain identifier [2]).

<<Summary of a Port Switch (Network Relay Device)>>

Figure 5:
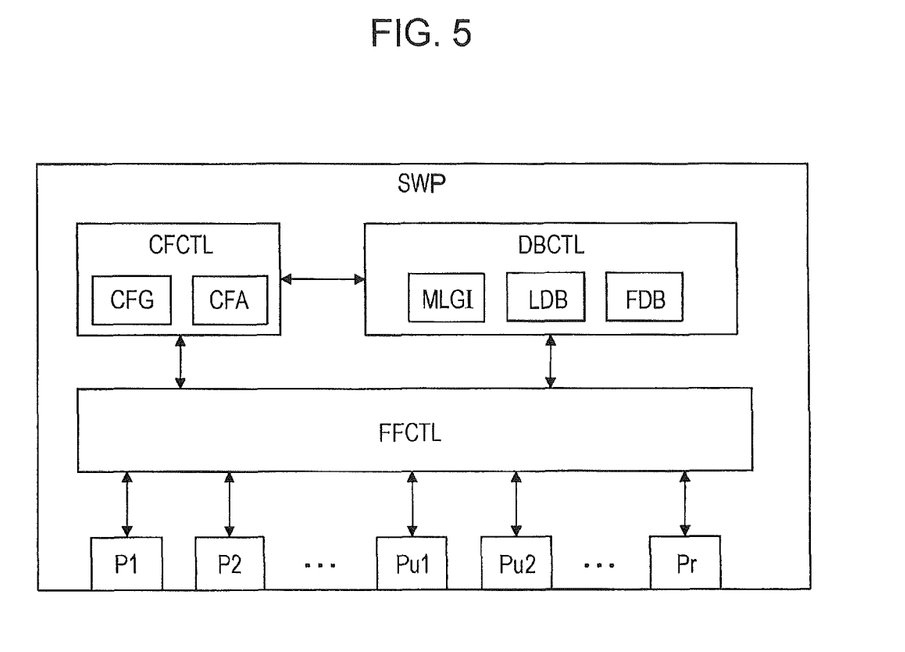
FIG. 5 is a block diagram illustrating an exemplary schematic configuration of the main section of a port switch in the communication system of FIG. 1.

FIG. 5 is a block diagram illustrating an exemplary schematic configuration of the main section of a port switch in the communication system of FIG. 1. Compared to the aforementioned exemplary configuration of FIG. 3, the port switch (network relay device) SWP depicted in FIG. 5 is different in that multi-chassis link aggregation information MLGI is added in the database management unit DBCTL, and in that the port switch SWP is provided with, as ports, fabric-switch oriented ports P1, P2, . . . , user-switch oriented ports (user ports) Pu1, Pu2, . . . , and a redundancy port Pr. Since configurations other than the aforementioned are the same as in FIG. 3, the following description focuses on the differences with FIG. 3.

If the port switch SWP1 of FIG. 1 is used as an example, the fabric switches SWF1 and SWF2 are respectively connected to the fabric-switch oriented ports P1 and P2 of FIG. 5, the user switches SWU1 and SWU2 are respectively connected to the user ports Pu1 and Pu2, and the port switch SWP2 is connected to the redundancy port Pr. It should be noted that, although in this case the two fabric-switch oriented ports P1 and P2 are representatively depicted, if three or more fabric switches are provided, three or more ports are accordingly provided. Furthermore, although in this case the two user ports Pu1 and Pu2 are representatively depicted, if three or more user switches are provided, three or more ports are accordingly provided.

In the example of FIG. 1, the redundancy ports Pr are provided in port switches SWP1 and SWP2 for which a multi-chassis link aggregation group (domain group) MLAG is set. However, for example, if the port switches SWP1 to SWP3 are implemented by box-type switch devices having the same configuration, SWP3 does not particularly need to be provided with a Pr, and in this case it is also possible to use a Pr as a user port or a fabric-switch port oriented by means of internal settings. Furthermore, the allocation of ports (for example, for fabric switches, for user switches, and so on) can be appropriately altered by means of internal settings, and because the basic functional configuration of FIG. 5 is the same as the functional configuration of FIG. 3 it is also possible to implement a fabric switch and a port switch by using box-type switch devices having the same configuration.

The multi-chassis link aggregation information MLGI of FIG. 5 includes a domain identifier or the like that is set in advance and indicates that a multi-chassis link aggregation group (domain group) MLAG is set thereto. For example, if the communication system of FIG. 2 is used as an example, the same domain identifier (domain identifier [1]) is included in the MLGI in the port switches SWP1 and SWP2, and another same domain identifier (domain identifier [2]) is included in the MLGI in the port switches SWP3 and SWP4. The control frame generation unit (control signal generation unit) CFG of FIG. 5 refers to the domain identifier in this MLGI, and generates a control frame (control signal) including this domain identifier. Furthermore, the control frame (control signal) including this domain identifier is transmitted from a predetermined port (in this case the fabric-switch oriented ports P1 and P2) via the frame forwarding control unit FFCTL (control signal transmission unit).

Figure 6:
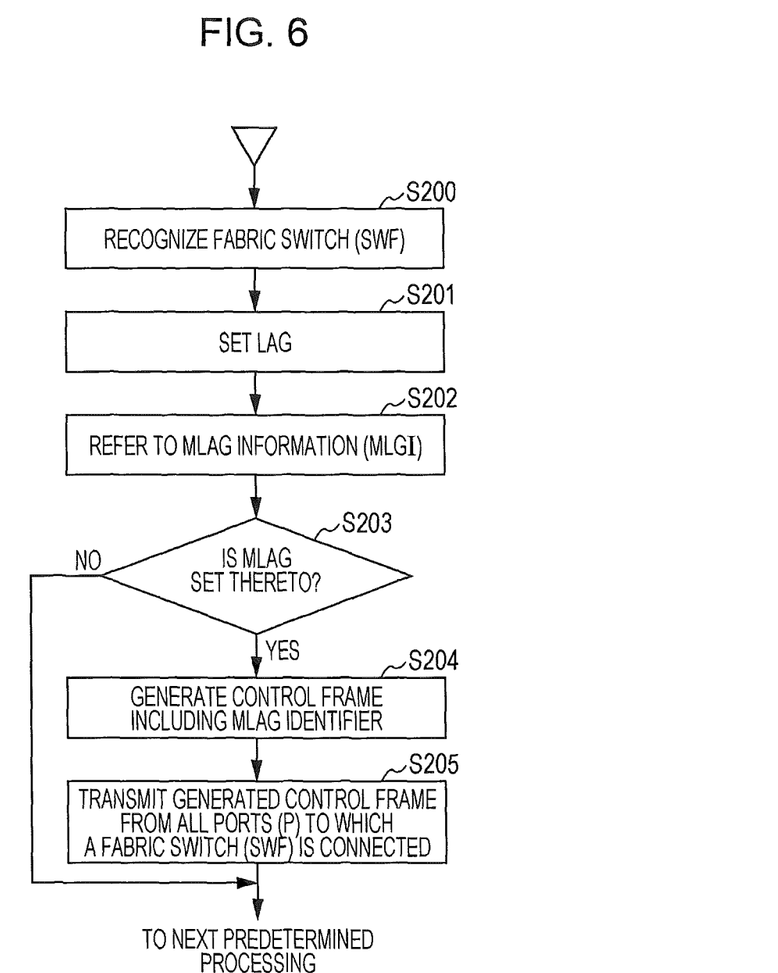
FIG. 6 is a flow diagram illustrating a main exemplary operation in the port switch of FIG. 5.

FIG. 6 is a flow diagram illustrating a main exemplary operation in the port switch of FIG. 5. A case is envisaged in which, first of all, each fabric switch SWF has transmitted a control frame including a fabric switch identifier, as indicated in S100 of FIG. 4. In this case, in FIG. 6, when the frame forwarding control unit FFCTL of FIG. 5 has received frames from the ports, the frame forwarding control unit FFCTL determines whether or not the frames are control frames, and notifies the control frame analysis unit CFA if the frames are control frames. The CFA determines whether or not there are fabric switch identifiers in the control frames, and if there are identifiers, the CFA notifies, to the database management unit DBCTL, the identifier and the port at which the identifier was received. Therefore, the port switch SWP of FIG. 5 recognizes the port at which the fabric switches SWF are connected (step S200).

Next, the database management unit DBCTL receives the aforementioned notification from the control frame analysis unit CFA, and, for example, allocates the same link identifier or the like to the ports that received the fabric switch identifiers, and registers, in the link table LDB, the relationship and so on of the ports, the link identifiers, and the fabric switch identifiers. Therefore, the port switch SWP of FIG. 5, for example, sets the ports as a link aggregation group LAG, as described in FIG. 8 and so on (step S201).

Next, the control frame generation unit (control signal generation unit) CFG refers to the multi-chassis link aggregation information MLGI (step S202), and determines whether or not a multi-chassis link aggregation group (domain group) MLAG is set thereto (in other words, whether or not a domain identifier is included in the MLGI) (step S203). If a MLAG is set, the CFG generates a control frame (control signal) including the domain identifier (step S204). The frame forward control unit FFCTL (control signal transmission unit) refers to the link table LDB and thereby recognizes all ports to which a fabric switch is connected, and forwards the control frame (control signal) generated in step S204, from all of these ports (S205). The fabric switch SWF of FIG. 3 sets a sublink SLK by carrying out the processing of step S101 and thereafter of FIG. 4 in response to step S205.

By using the communication system of the present embodiment 1 as described above, representatively, fault resistance is improved and furthermore it becomes possible to prevent signal loopback. It should be noted that each of the port switch SWP and the fabric switch SWF is constituted by a box-type switch device. By using a box-type fabric system in which these box-type switch devices are used, various types of beneficial advantages are obtained compared to using a system including chassis-type switch devices in which both the functionalities of a port switch and a fabric switch are housed in one casing as previously mentioned. However, the configuration is not necessarily restricted to that of box-type switch devices, and even in the case where a configuration of chassis-type switch devices is used, because signal loopback may occur as described in FIG. 9, the same advantages are obtained by applying the configuration in the same way.

Embodiment 2

<<Configuration and Operation of a Communication System According to the Present Embodiment (Modified Example)>>

Figure 7:
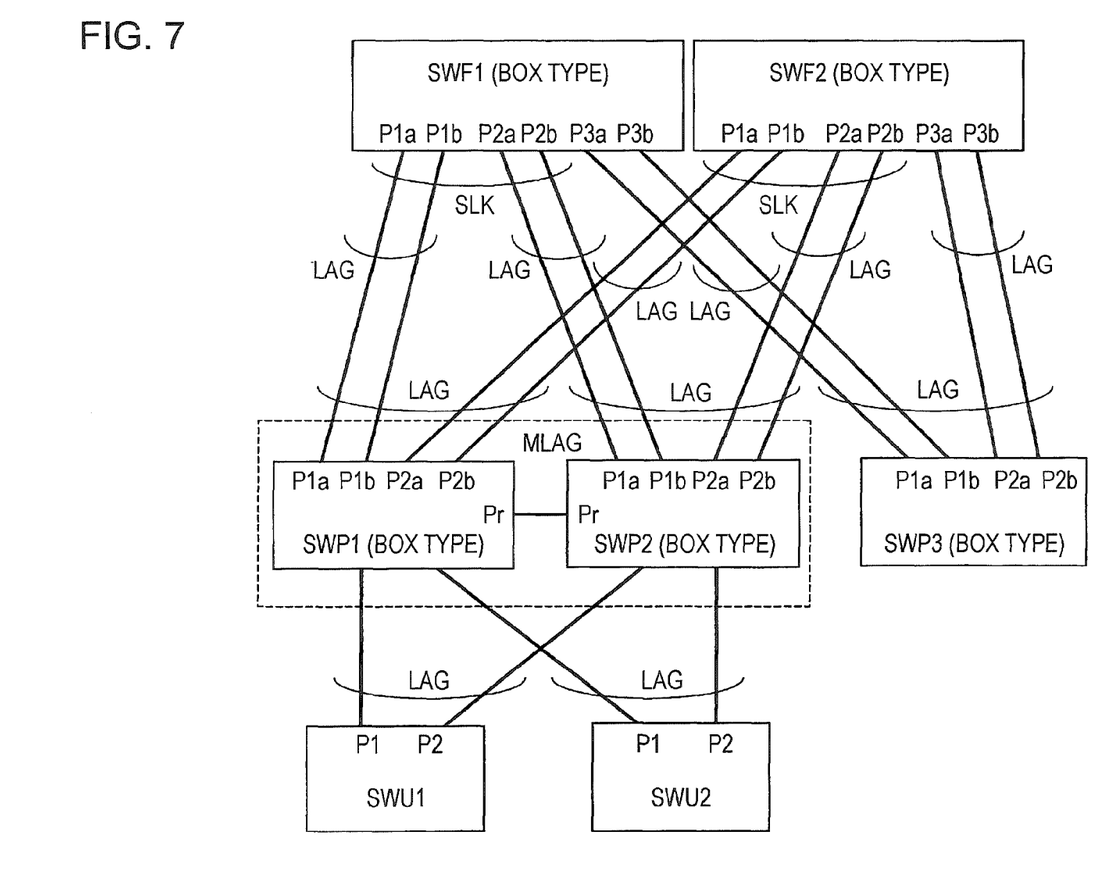
FIG. 7 is a schematic diagram illustrating an exemplary configuration and a main exemplary operation in a communication system according to embodiment 2 of the present invention.

FIG. 7 is a schematic diagram illustrating an exemplary configuration and a main exemplary operation in a communication system according to embodiment 2 of the present invention. The communication system depicted in FIG. 7 is provided with, as in the aforementioned exemplary configuration of FIG. 1, a plurality (two in this case) of fabric switches (network relay devices) SWF1 and SWF2, a plurality (three in this case) of port switches (network relay devices) SWP1 to SWP3, and user switches SWU1 and SWU2. However, the communication system of FIG. 7 is different from the exemplary configuration of FIG. 1 in that the communication lines between SWP1 to SWP3 and SWF1 to SWF2 are each constituted by pairs of communication lines.

Together with this, each of the port switches SWP1 to SWP3 of FIG. 7 are provided with a pair of ports P1$a$ and P1$b$ instead of the one port P1 in FIG. 1, and are provided with a pair of ports P2$a$ and P2$b$ instead of the one port P2 in FIG. 1. Likewise, each of the fabric switches SWF1 and SWF2 of FIG. 7 are provided with three pairs of ports (P1$a$, P1$b$, P2$a$, P2$b$, P3$a$, and P3$b$) instead of the three ports P1 to P3 in FIG. 1. For example, P1$a$ and P1$b$ of SWP1 are connected with P1$a$ and P1$b$ of SWF1 via a pair of communication lines, SWP1 sets a link aggregation group LAG for P1$a$ and P1$b$ thereof, and SWF1 also sets a LAG for P1$a$ and P1$b$ thereof. Furthermore, P2$a$ and P2$b$ of SWP1 are connected with P1$a$ and P1$b$ of SWF2 via a pair of communication lines, SWP1 sets a LAG for P2$a$ and P2$b$ thereof, and SWF2 also sets a LAG for P1$a$ and P1$b$ thereof. Other communication lines between SWP1 to SWP3 and SWF1 to SWF2 also have the same configuration, pairs of communication lines are provided instead of the single communication lines depicted in FIG. 1, the pairs of communication lines are connected using pairs of ports, and a LAG is set for each of the pairs of ports.

For example, if the fabric switch SWF1 is used as an example, SWF1 sets a link aggregation group LAG for the pair of ports P1$a$ and P1$b$ between SWF1 and the port switch SWP1, and thereby causes P1$a$ and P1$b$ to logically (virtually) function as one port. Furthermore, SWF1 sets a LAG for the pair of ports P2$a$ and P2$b$ between SWF1 and the port switch SWP2, and thereby causes P2$a$ and P2$b$ to logically (virtually) function as one port. In addition to this, SWF1 sets a SLK for the pair of ports P1$a$ and P1$b$ between SWF1 and SWP1 and the pair of ports P2$a$ and P2$b$ between SWF1 and SWP2, and thereby causes these ports to logically (virtually) function as a single port.

The specific method for setting a sublink SLK is the same as that of embodiment 1. In other words, the port switch SWP1 transmits a control frame (control signal) including a domain identifier from the ports P1$a$, P1$b$, P2$a$, and P2$b$, and the port switch SWP2 also transmits a control frame (control signal) including a domain identifier the same as that of SWP1 from the ports P1$a$, P1$b$, P2$a$, and P2$b$. Therefore, the fabric switch SWF1 for example receives control frames having the same domain identifier from the ports P1$a$, P1$b$, P2$a$, and P2$b$, and therefore sets a sublink SLK for these ports.

When this kind of exemplary configuration is used, port switches SWP1 and SWP2 (logically one switch), for which a multi-chassis link aggregation group (domain group) MLAG is set, are connected with, for example, fabric switch SWF1 by four communication lines for which link aggregation has been practically set. As a result, fault tolerance is further improved and so on, and signal loopback between these switches can also be prevented as in embodiment 1.

The invention implemented by the present inventors has been specifically described on the basis of the embodiments; however, the present invention is not restricted to the embodiments, and various alterations are possible without deviating from the essence of the present invention. For example, the aforementioned embodiments have been described in detail in order to describe the present invention in an easy to understand manner, and are not necessarily restricted to having all of the configurations described. Furthermore, it is possible for part of the configuration of a certain embodiment to be replaced by the configuration of the other embodiment, and, furthermore, it is also possible for the configuration of the other embodiment to be added to the configuration of the certain embodiment. Furthermore, it is possible for part of the configuration of the embodiments to be removed or replaced, or for another configuration to be added.

For example, a description has been mainly given with the example of a communication system in which a LAN switch (L2 switch) is used; however, it is possible to similarly apply the present invention also to a communication system in which a L3 switch is used.

What is claimed is:

1. A communication system, comprising:
a plurality of port switches that include first and second port switches;
a plurality of fabric switches that construct communication paths among the plurality of port switches; and
a user switch,
wherein each of the plurality of port switches is connected to each of the plurality of fabric switches via different communication lines,
wherein the first and second port switches are connected by a common communication line between redundancy ports of the first and second port switches to thereby form a same domain group,
wherein the user switch is connected to each of the first and second port switches via different communication lines, and also sets link aggregation for ports of the user switch that include connection sources of the communication lines that connect the user switch and each of the first and second port switches,
wherein each of the plurality of fabric switches sets a sublink that causes plurality of ports of the fabric switches to logically function as one port for a plurality of ports to which the first and second port switches that form the same domain group are connected,
wherein each of the first and second port switches comprises:
a control signal generation unit that generates control signals including same domain identifiers indicating that the first and second port switches form the same domain group; and
a control signal transmission unit that transmits the control signals to each of the plurality of fabric switches via different communication lines, and
wherein each of the plurality of fabric switches comprises:
a control signal analysis unit that analyses the control signals received at the plurality of ports of the fabric switches, and determines whether or not the domain identifiers are present in the control signals; and
a link setting unit that, if the domain identifiers are present, sets the sublink for the plurality of ports of the fabric switches that have received same domain identifiers.

2. The communication system according to claim 1, wherein each of the plurality of port switches is constituted by a box-type switch device, and
   wherein each of the plurality of fabric switches is constituted by a box-type switch device.

3. A network relay device, comprising:
   a plurality of fabric-switch oriented ports that respectively connect to a plurality of fabric switches;
   a redundancy port that connects to a first port switch other than the network relay device via a common communication line;
   a domain identifier indicating that a same domain group is set to the network relay device and the first port switch,
      wherein the domain identifier is set in advance to the network relay device and the first port switch, the domain identifier indicating that a multi-chassis link aggregation group is set to the network relay device,
      wherein the domain identifier is set to the network relay device and the first port switch, and the multi-chassis link aggregation group is set to the network relay device and the first port switch, and
      wherein, as the multi-chassis link aggregation group, the network relay device and the first port switch are connected by the common communication line and function as one switch;
   a control signal generation unit that generates a control signal including the domain identifier; and
   a control signal transmission unit that transmits the control signal from the plurality of fabric-switch ports,
   wherein the domain identifier is stored in a database of the network relay device in advance,
   wherein each of the plurality of fabric switches comprises:
      a control signal analysis unit that analyses the control signal received at the plurality of fabric-switch ports,
   wherein the control signal analysis unit is configured to determine whether the domain identifier is present in the control signal, and
   wherein said each of the plurality of fabric switches further comprises:
      a link setting unit that, if the domain identifier is present, sets a sublink for ports of the fabric switches that have received the domain identifier.

4. The network relay device according to claim 3, wherein the network relay device is constituted by a box-type switch device.

5. The network relay device according to claim 3, wherein the control signal transmission unit transmits the control signal to said each of the plurality of fabric switches via different communication lines.

6. A network relay device, comprising:
   a plurality of ports that respectively connect to a plurality of port switches;
   a control signal analysis unit; and
   a link setting unit,
   wherein a first port switch and a second port switch from among the plurality of port switches are connected by a common communication line and are thereby set as a same domain group, and have functionality for transmitting control signals including a same domain identifier indicating that the same domain group is set,
   wherein the domain identifier is set in advance to the first port switch and the second port switch, and indicates that a multi-chassis link aggregation group is set to the first port switch and the second port switch,
   wherein, as the multi-chassis link aggregation group, the first port switch and the second port switch are connected by the common communication line and function as one switch,
   wherein the control signal analysis unit analyses the control signals received at the plurality of ports, and determines whether or not the domain identifier is present in the control signals,
   wherein, if the domain identifier is present, the link setting unit sets, for a plurality of ports that have received the domain identifier, a sublink that causes the plurality of ports to logically function as one port,
   wherein the domain identifier is stored in a database of the network relay device in advance,
   wherein each of the first port switch and the second port switch comprises:
      a control signal generation unit that generates the control signals including the same domain identifier indicating that the first port switch and the second port switch form the same domain group, and
   wherein said each of the first port switch and the second port switch further comprises:
      a control signal transmission unit that transmits the control signals to each of the plurality of ports via different communication lines.

7. The network relay device according to claim 6, wherein the network relay device is constituted by a box-type switch device.

* * * * *